Nov. 5, 1963 H. B. ROOKS ETAL 3,109,587
METHOD OF MECHANICAL ADDITION
Filed March 9, 1960
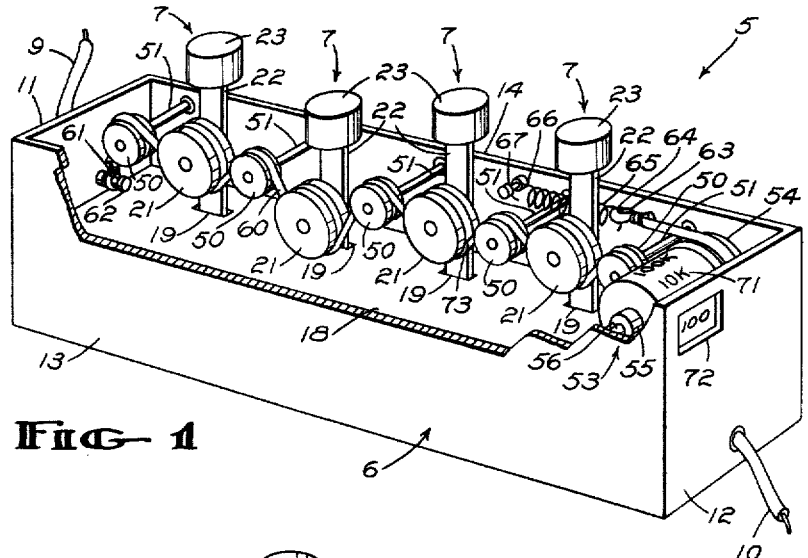
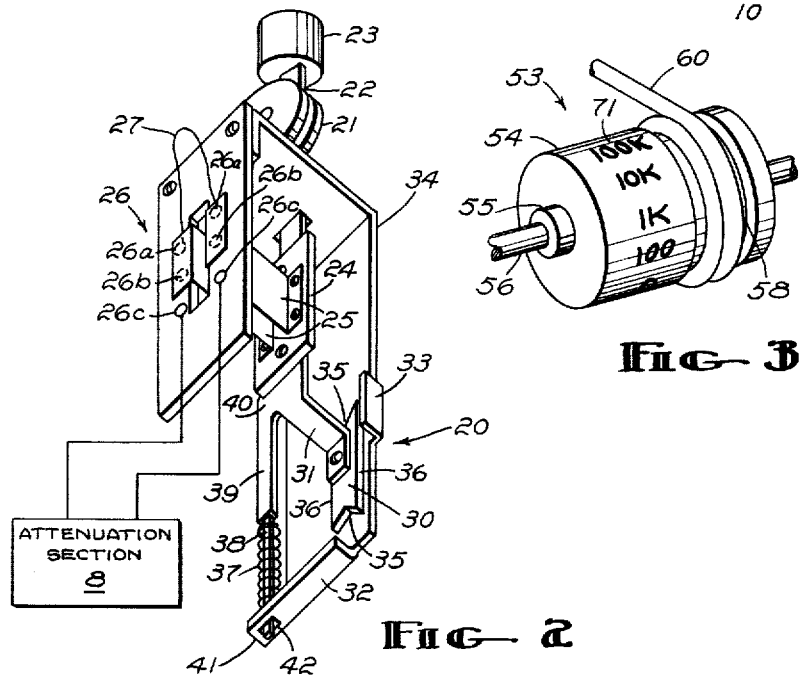
INVENTORS
ABBOTT F. MAYER
HOWARD B. ROOKS
BY
Moody and Harris
ATTORNEYS

3,109,587
METHOD OF MECHANICAL ADDITION
Howard B. Rooks and Abbott F. Mayer, Marion, Iowa, assignors to Collins Radio Company, Cedar Rapids, Iowa, a corporation of Iowa
Filed Mar. 9, 1960, Ser. No. 13,795
2 Claims. (Cl. 235—61)

This invention relates to an indicating device and more particularly to an indicating device of the type having an indicating element responsive to movement of a plurality of attenuation insertion actuators to provide a display of the amount of attenuation in the signal path at any given time.

Attenuators of the type contemplated for use in conjunction with this invention generally comprise a plurality of resistive components arranged to form a network that is best suited to meet a particular requirement. Such an attenuator may include a plurality of attenuation sections which may be individually inserted into the circuit to vary the attenuation in the signal path. With this type of attenuator a movable actuator, such as for example a pushbutton, must be provided to switch each section into and out of said path. The use of a plurality of actuators, however, created a new problem since the operator had to count each actuator in a given position and then calculate the total amount of attenuation in the signal path. Obviously as the number of actuators utilized increased the undesirability of individually checking the position of each likewise increased.

In addition, the possibility of error was heretofore another major disadvantage of utilizing a plurality of actuators since it was frequently difficult to determine the position of each actuator and this frequently led to a miscount of the number of actuators in any one position, for example, in a depressed position in the case of a pushbutton actuator. Here again, the use of a greater number of actuators increased the danger of error.

It is therefore an object of this invention to provide means which will enable an operator to determine positively, and at a glance the amount of attenuation in the signal path.

More particularly, it is an object of this invention to provide an indicator, which is responsive to movement of each attenuation insertion actuator from a first to a second position, to vary the indication according to the number of actuators in said second position.

Still more particularly, it is an object of this invention to provide an indicating device which includes a plurality of pushbutton actuators each of which has a pulley mounted thereon over which a length of a cord is trained so that when said pushbutton is depressed a portion of the cord is moved lengthwise moving an indicating element having indicia thereon, said indicia being adjacent to a second element having a reference thereon, so that the resulting indication displayed by the device is related to the number of pushbuttons depressed at any given time.

With these and other objects in view which will become apparent to one skilled in the art as the description proceeds this invention resides in the novel construction, combination and arrangement of parts substantially as hereinafter described and more particularly defined by the appended claims, it being understood that such changes in the precise embodiment of the hereindisclosed information may be included as come within the scope of the claims.

The accompanying drawings illustrate one complete example of the embodiment of the invention construed accordingly in the best mode so far devised for the practical application of the principles thereof, and in which:

FIGURE 1 is a perspective view of an attenuating device utilizing the indicating means of this invention;
FIGURE 2 is an enlarged perspective view of the pushbutton actuator, a portion of which is shown in FIGURE 1; and
FIGURE 3 is an enlarged perspective view of the drum shown in FIGURE 1.

As shown in the drawings, in which like numerals have been used for like characters throughout, the numeral 5 refers generally to an attenuator, which may include frame means 6 and a plurality of pushbutton actuators 7, which actuators may be selectively depressed to switch an attenuation section 8 (shown in FIGURE 1 in block form) into a signal path.

The attenuation section may be conventional and may, for example, comprise a resistive network such as shown in Radio Engineers' Handbook (1943 Edition) by Terman, at page 215 et seq. The particular network utilized would, of course, depend upon the particular requirement to be met.

The signal to be attenuated may be applied to the attenuator through signal input lead 9 and the attenuated output signal taken from output lead 10, which leads as shown in FIGURE 1, may extend from opposite end walls 11 and 12, respectively, of frame means 6.

As shown in FIGURE 1, frame means 6 may comprise, in addition to opposite end walls 11 and 12, a front wall 13 and a back wall 14 each of which joins the end walls at opposite sides. A bottom (not shown) and a partition 18 may be provided to form a substantially closed box inside of which a plurality of attenuation sections may be housed. In addition each pushbutton actuator 7 may be mounted on partition 18 in conventional manner with actuating rod 22 of each actuator extending through aperture 19 therein.

Each pushbutton actuator 7 may comprise a conventional pushbutton type switch having means 20, as shown in FIGURE 2, to releasably secure it in its depressed position, and a pulley 21 mounted for rotation on actuating rod 22 thereof. If desired, a knob 23 may be attached to the upper end of rod 22 to facilitate pushing the rod longitudinally downward to its depressed position.

As shown in FIGURE 2 each such pushbutton may also have a slider 24 fixed to the lower end of actuating rod 22 in any conventional manner. Slider 24 may, in turn, include a pair of slidable bridging arms 25 which are insulated from one another and which at all times make contact with two of three contacts 26. Contacts 26 are spaced and insulated from one another and disposed so that two sets of three contacts each are arranged in two lines parallel to rod 22. By being so disposed, the upper contacts 26a and the center contacts 26b on each side are bridged when pushbutton 7 is not depressed, and the lower contacts 26c and center contacts 26b are bridged when pushbutton 7 is depressed.

A lead 27 directly connects the upper contacts 26a while attenuation section 8 is connected between the lower contacts 26c. By applying the signal input to one of the center contacts 26b and the signal output to the other center contact 26b the signal input is coupled directly to the signal output when pushbutton 7 is not depressed and therefore no attenuation results. When button 7 is depressed, however, the signal is attenuated in conventional manner since it must pass through attenuator section 8 before being coupled out through the output lead.

The attenuation sections utilized are, of course, commonly tied together so that the output from one section passes directly to the input of the next section. It should therefore be obvious that any number of sections might be used as desired, and each will be individually inserted into the circuit by an actuator 7. While each attenuation section is preferably uniform to facilitate displaying the amount of attenuation in the signal path at any given time, as more fully brought out hereinafter, it is to be appreciated that the amount of attenuation of each section need not necessarily be uniform if the information displayed by the indicating means is not made dependent on the uniformity of the sections.

As shown and described herein, each pushbutton 7 has an identical pulley 21 mounted thereon in such a way that each pulley moves downwardly the same distance when the pushbutton is moved to its depressed position. If, however, different values of attenuation for the various attenuator sections are to be utilized, then it may be found desirable to vary the size of pulleys 21 and/or the longitudinal movement of actuator 7 as to be brought out more fully hereinafter.

Means 20 on each pushbutton, releasably securing the same in its depressed position, is conventional. As shown in FIGURE 2, means 20 may comprise a ratchet 30 which arm may be mounted for rotation on an arm 31, which arm may be integrally formed with the lower end of rod 22. Ratchet 30 is rotated by means of flanges 32 and 33 respectively, which may form an integral part of pushbutton housing 34, so that when initially depressed, flange 32 turns ratchet 30 just enough so that the lower edge of flange 33, engages one of the two notches 35 in the ratchet to hold the button in its depressed position.

As is conventional, when downward force is again applied to actuator 7, flange 32 rotates ratchet 30 in the same direction an additional distance so that, when released, flange 33 engages one of the sides 36 of ratchet 30 to turn the ratchet until it clears flange 33 and therefore releases the pushbutton so that it can move upwardly to its undepressed position.

A spring 37 is provided to bias the pushbutton to its uppermost or undepressed position. As shown in FIGURE 2, this spring may surround the depending portion 38 of L-shaped arm 39, which arm may have its horizontal portion 40 integrally formed with the lower end of rod 22. Spring 37 may then be confined between horizontal portion 40 and an extended part 41 of flange 32 by providing an aperture 42 through the flange to permit longitudinal movement of depending portion 38.

As shown in FIGURE 1, a plurality of pulleys 50 are mounted for rotation on shafts 51, each of which may be fixed to the back wall 14 of frame means 6 in any conventional manner. Preferably, a pulley 50 is provided on each side of pushbutton 7 and aligned therewith.

As shown in FIGURES 1 and 3, the movable member of indicating element 53 may comprise a drum 54 having a hub 55 to which an extended shaft 56 may be fixed in any conventional manner. Shaft 56 may then, in turn, be mounted for rotation in suitable bearing means (not shown) in the front and back walls of frame means 6. Drum 54 may be provided with a groove 58, as best shown in FIGURE 3, which is aligned with adjacent pulley 50.

An elongated cord or other similar means 60, which maintains a constant length but is laterally flexible, may be trained over each pulley 50, under each pulley 21, and wrapped around drum 54 to serve as a motion transmission means responsive to movement of actuators 7. One end 61 of this cord is preferably fixed to end wall 11 in conventional manner as, for example, by being tied in a loop and hooked over pin 62 fixed to end wall 11. The other end 63 of cord 60 may be tied in a loop and hooked over one end 64 of tensioning spring 65, which spring, in turn, has its other end 66 fixed to back wall 14 by, for example, being hooked over a fixed pin 67 on back wall 14.

As shown in FIGURES 1 and 3, cooperable indicia means is provided by a series of increasing numerals or indicia 71, which may be painted or etched on the cylindrical surface of the movable member or drum 54 and a reference, which may be provided by an aperture or window 72 in end wall 12 of such size and so positioned that only one indicia is visible therethrough at all times.

It is to be appreciated, of course, that other indicating means might be used such as a rod, with indicia thereon, that is movable longitudinally relative to a fixed member having a reference mark thereon, without departing from the scope of this invention. It is also to be realized that other indicia might likewise be used in place of those shown in the drawings, such as for example, a series of integers to indicate the number of pushbuttons depressed.

In operation when no pushbuttons are depressed cord 60 will be tensioned by spring 65 and a predetermined indicia will be visible through window 72. When a pushbutton is thereafter depressed, cord 60 will be laterally flexed downwardly by the downward motion of the actuator and this will cause lengthwise movement of that portion of the cord between the application of the force by actuator 7 and spring 65, thereby stretching spring 65. Since the portion of cord 60 caused to move is wrapped around drum 54, drum 54 will be caused to rotate a predetermined distance, depending upon the lengthwise movement of the cord. With all of the pulleys 21 identical and moved downwardly the same distance to the depressed position of each actuator 7, any actuator may be depressed and a correct reading will appear in the window so long as the attenuation sections 8 are identical. If the sections differ in attenuation, however, then the indicia may be appropriately spaced so that a change in actuator movement and size of pulley utilized will cause different indicia to appear as different pushbuttons are depressed.

FIGURE 1 illustrates the indicating device of this invention with one pushbutton depressed so that the first ascending indicia is visible through window 72.

As a plurality of pushbuttons are depressed the drum will turn an additional distance as each is depressed so that the total amount of rotation of the drum depends upon the total number of pushbuttons so depressed.

When a pushbutton is released spring 65 will compress to maintain tension on the cord and this will, of course, cause drum 54 to turn or rotate in the opposite direction so the indicia appearing in window 72 will always be determined by the number of buttons depressed at any given time.

Assuming that the attenuator utilized has four pushbuttons each of which will attenuate the signal equally, an ascending scale of attenuation or indicia may be used. By spacing each indicia on the cylindrical surface of drum 54 a distance equal to the distance the drum rotates each time a pushbutton is depressed, the proper indicia will always appear in window 72 so that the operator can tell at a glance the exact amount of attenuation in the circuit. Thus, if no pushbuttons are depressed, a zero attenuation reading may appear in window 72, while, when one pushbutton is depressed, a definite reading, for example 100, may appear in the window. In like manner, when additional pushbuttons are depressed, the attenuation will be increased, and this is reflected by the indicia on drum 54 by providing higher values of attenuation. For example, when two pushbuttons are depressed the reading through window 72 may be 1K, when three pushbuttons are depressed this reading may be 10K, and when four pushbuttons are depressed this reading may be 100K.

It should be evident from the foregoing that while indicating means of this invention is particularly suited for use in conjunction with an attenuator, it could likewise be used in conjunction with any mechanism requiring a plurality of movable actuators, which need not necessarily be pushbutton actuators, where it is desirable to accurately and readily determine the number of said movable actuators in any one position at any given time.

From the foregoing it should also be evident that, while the drawings and descriptions thereof describe cord 60 as being trained over a plurality of pulleys, these pulleys might be replaced by a series of abutments over which the cord may slide.

In view of the foregoing it should be evident to those skilled in the art that this invention provides an indicating device which, although simple, is reliable and enables an operator to quickly and positively determine the required information needed without the necessity of counting the number of movable actuators in a particular position.

What is claimed as our invention is:

1. An indicating device of the type used in a signal attenuating mechanism having a plurality of movable actuators to selectively switch attenuating sections into and out of a signal path, comprising: laterally flexible motion transmission means, said means having a lengthwise movable portion which maintains a substantially constant length, lengthwise movement of said portion being caused by lateral flexing of said motion transmission means; indicating means including a fixed member and a relatively movable member, said relatively movable member engaging said lengthwise movable portion of said motion transmission means and constrained to partake of all lengthwise movement thereof; a plurality of movable actuators mounted for reciprocal motion between a first position and a second position; means for releasably securing each said movable actuator in said second position; switch means on each said actuator whereby when said actuator is in said second position an attenuation section is switched into a signal path and whereby when said actuator is in said first position said attenuation section is switched out of said signal path; means connected with each said actuator to engage said motion transmission means and maintain the same laterally flexed whenever said switch is in said second position; and cooperable indicating means on said members so positioned to give an indication determined by the number of movable actuators in said second position.

2. An indicating device of the type used in attenuating mechanisms having a plurality of signal attenuation sections which may be individually inserted into a signal path, comprising: frame means for housing a plurality of attenuation sections; laterally flexible means movable lengthwise within predetermined limits and of substantially constant length; means fixing one end of said laterally flexible means to said frame means; indicating means; indicating means including a fixed member and a relatively movable member, said relatively movable member engaging said laterally flexible means and constrained to partake of all lengthwise movement thereof; indicia means on said movable member; first spring means connected with said frame means and the other end of said laterally flexible member urging said movable member toward a predetermined position with respect to said fixed member; a plurality of actuating members for selectively switching a plurality of signal attenuation sections into a signal path; means mounting said actuating members on said frame means for independent movement between a first and a second position, each of said actuating members engaging and acting upon said flexible means whenever actuated toward said second position to laterally flex the same and thereby cause said indicia means on said movable member to be moved with respect to said fixed member; cooperable means connected with said actuating members and said frame means for releasably securing each said actuating member in said second position; and second spring means connected with said actuating members and said frame means to cause the former to move toward said first position when released from said second position to permit said flexible means to reassume its original position and thereby allow reciprocal movement of said indicia means on said movable member with respect to said fixed member so that said indicating means at all times reflects the number of actuating members acting on said flexible means.

References Cited in the file of this patent
UNITED STATES PATENTS

| | | |
|---|---|---|
| 610,181 | Hassler | Sept. 6, 1898 |
| 856,997 | Cutter et al. | June 11, 1907 |
| 1,088,971 | Davis | Mar. 3, 1914 |
| 2,193,929 | Lion | Mar. 19, 1940 |
| 2,444,549 | Anderson | July 6, 1948 |
| 2,527,734 | Isserstedt | Oct. 31, 1950 |
| 2,720,961 | Smith | Oct. 18, 1955 |
| 2,767,909 | Morris | Oct. 23, 1956 |
| 2,803,805 | Wilson | Aug. 20, 1957 |
| 2,916,566 | Meyer et al. | Dec. 8, 1959 |
| 2,961,621 | Tanenbaum et al. | Nov. 22, 1960 |
| 2,977,428 | Showalter | Mar. 28, 1961 |

UNITED STATES PATENT OFFICE
CERTIFICATE OF CORRECTION

Patent No. 3,109,587            November 5, 1963

Howard B. Rooks et al.

It is hereby certified that error appears in the above numbered patent requiring correction and that the said Letters Patent should read as corrected below.

Column 6, line 3, strike out "; indicating means".

Signed and sealed this 28th day of April 1964.

(SEAL)
Attest:
ERNEST W. SWIDER

Attesting Officer

EDWARD J. BRENNER
Commissioner of Patents